US008654134B2

(12) United States Patent
Abdo et al.

(10) Patent No.: US 8,654,134 B2
(45) Date of Patent: Feb. 18, 2014

(54) COMMAND REMOTING

(75) Inventors: Nadim Y. Abdo, Bellevue, WA (US);
Asael Dror, Palo Alto, CA (US); Max Alan McMullen, Redmond, WA (US);
Stuart Ray Patrick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 12/330,295

(22) Filed: Dec. 8, 2008

(65) Prior Publication Data
US 2010/0141678 A1    Jun. 10, 2010

(51) Int. Cl.
*G06T 1/00*    (2006.01)
*G09G 5/00*    (2006.01)

(52) U.S. Cl.
USPC .......................................... 345/522; 345/619

(58) Field of Classification Search
None
See application file for complete search history.

(56) References Cited

U.S. PATENT DOCUMENTS

| | | | | |
|---|---|---|---|---|
| 6,426,748 | B1* | 7/2002 | Megahed | 345/419 |
| 8,056,093 | B1* | 11/2011 | McClure | 719/323 |
| 2003/0160793 | A1 | 8/2003 | Emberling et al. | |
| 2004/0207641 | A1* | 10/2004 | Palm et al. | 345/619 |
| 2005/0091571 | A1 | 4/2005 | Leichtling | |
| 2007/0013723 | A1 | 1/2007 | Souza et al. | |
| 2007/0046980 | A1 | 3/2007 | Coleman et al. | |
| 2007/0079244 | A1 | 4/2007 | Brugiolo | |
| 2007/0088727 | A1 | 4/2007 | Kindig | |
| 2007/0220168 | A1 | 9/2007 | Parsons et al. | |
| 2007/0244967 | A1 | 10/2007 | Ben-Shachar et al. | |
| 2008/0109810 | A1* | 5/2008 | Pronovost et al. | 718/104 |
| 2008/0168479 | A1 | 7/2008 | Purtell et al. | |
| 2008/0256300 | A1* | 10/2008 | Lee et al. | 711/125 |
| 2008/0266296 | A1* | 10/2008 | Ramey et al. | 345/440 |
| 2008/0316218 | A1* | 12/2008 | Kilani et al. | 345/522 |
| 2009/0067396 | A1* | 3/2009 | Fischer | 370/338 |
| 2009/0225098 | A1* | 9/2009 | Xu et al. | 345/620 |
| 2010/0079489 | A1* | 4/2010 | Cheng et al. | 345/629 |

FOREIGN PATENT DOCUMENTS

| | | |
|---|---|---|
| CN | 1470989 A | 1/2004 |
| CN | 1851692 A | 10/2006 |
| CN | 101263485 A | 9/2008 |

OTHER PUBLICATIONS

Russinovich, M. and Solomon, D., Microsoft Windows Internals, Fourth Edition, Redmond, Washington, Microsoft Press, 2005.*
"3D Graphics Acceleration over Remote Desktop," http://www.virtualdub.org/blog/pivot/entry.php?id=208, downloaded 2008, 1-4.
"Avalon Remoting is Now a Whole Lot Less Attractive," http://www.virtualdub.org/blog/pivot/entry.php?id=216, downloaded 2008, 1-3.
"The Role of the Windows Display Driver Model in the DWM," http://blogs.msdn.com/greg_schechter/archive/2006/04/02/566767.aspx, 2006, 1-7.
Grobler, R., "Graphics Drivers: Leading the Way to Windows Vista," http://ati.amd.com/products/wp/atiwddmwhitepaperfinalv38.pdf, Jun. 14, 2007, 1 page.

(Continued)

*Primary Examiner* — Ke Xiao
*Assistant Examiner* — Donna J Ricks
(74) *Attorney, Agent, or Firm* — Henry Gabryjelski; Kate Drakos; Micky Minhas

(57) ABSTRACT

Various techniques for remoting graphics are described in the claims, drawings, and text forming a part of the present disclosure.

20 Claims, 13 Drawing Sheets

(56) References Cited

OTHER PUBLICATIONS

"What is the Difference Between WPF on XP and Vista," http://dotnet.org.za/rudi/archive/2007/06/14/what-is-the-difference-between-wpf-on-xp-and-vista.aspx, Jun. 14, 2007, 1 page.

Yong, Z., "WPF, Terminal Services & Bitmap Remoting," http://shevaspace.blogspot.com/2008/04/wpf-terminal-services-bitmap-remoting_05.html, Apr. 5, 2008, 1-2.

PCT Application No. PCT/US2009/062752 : International Search Report and Written Opinion of the International Searching Authority, May 25, 2010, 9 pages.

* cited by examiner

COMMAND REMOTING

BACKGROUND

Terminal services provide techniques for allowing access to applications and data stored on a server. User input is send over a network to the server and audio and graphics are sent from the server to the client. Over the years different techniques have been developed to remote graphics such as command level remoting and bitmap level remoting.

Bitmap level remoting is generally considered to be the easier of the two techniques to implement. In bitmap remoting, the graphics processing is performed on the terminal server and the final image, e.g., an array of pixel values that forms a bitmap, is compressed and sent over the network to the client. This technique requires a server that has enough computational power to render images for one or more clients.

Command level remoting on the other hand offloads the graphics rendering to the client. Primitives, e.g., vertices that can be processed by a driver and executed by a graphics processor, can be captured and sent to the client. This reduces the processing power required to remote graphics, however more bandwidth is needed to send data representing 3D graphics such as those of a videogame or user interface require than bitmaps.

Those having skill in the art thus far have attempted to perform command level remoting by capturing commands that generate primitives, e.g., vertices, and constants, output by application program interfaces. Generally, as different types of applications were developed over the years, e.g., new user interfaces that use 3D hardware, videogames, etc., the trend has been to capture the commands output by each application using custom remoting components optimized to capture specific API constructs output by specific APIs. This has lead to an architecture where the capture of data occurs at a multitude of places in the computer and this architecture requires an system that is becoming increasingly complex. Also, as commands from more and more applications are remoted it has become difficult to synchronize the rendering operations across different remoting components. For example, a GUI box may be generated using one technique and the text that populates icons may be drawn with another. If the commands are not synchronized the text may appear in the wrong portion of the GUI box or at the wrong time. Accordingly, techniques for synchronizing commands are desirable.

SUMMARY

An example embodiment of the present disclosure describes a method. In this example, the method includes, but is not limited to synchronizing, by at least one kernel mode process, vertices for graphics primitives, the vertices stored in vertex buffers; and sending the synchronized vertices for the graphics primitives to a terminal server client. In addition to the foregoing, other aspects are described in the claims, drawings, and text forming a part of the present disclosure.

An example embodiment of the present disclosure describes a method. In this example, the method includes, but is not limited to receiving, from a user space process, information associated with the vertices for graphics primitives; receiving, from a graphics device interface, information associated with bit-block transfer commands; synchronizing, by at least one kernel mode process, the vertices for the graphics primitives with the bit-block transfer commands; and sending the synchronized vertices for the graphics primitives and commands across a machine boundary. In addition to the foregoing, other aspects are described in the claims, drawings, and text forming a part of the present disclosure.

An example embodiment of the present disclosure describes a method. In this example, the method includes, but is not limited to generating, by a user mode driver, vertices for primitives; synchronizing the vertices for primitives; and sending the synchronized vertices for primitives to a terminal server client. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
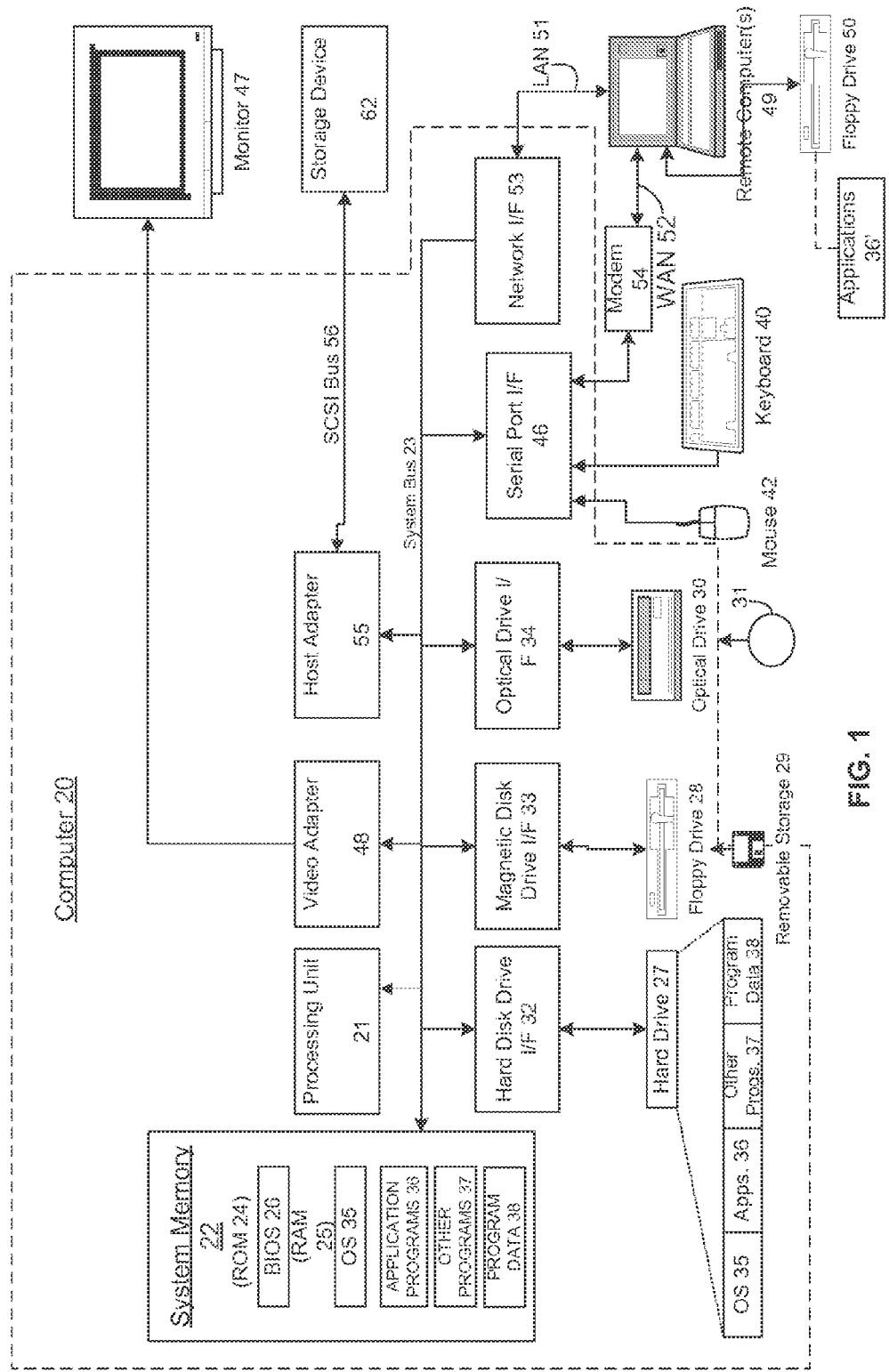
FIG. 1 depicts an example computer system wherein aspects of the present disclosure can be implemented.

Embodiments may execute on one or more computers. FIG. 1 and the following discussion is intended to provide a brief general description of a suitable computing environment in which the disclosure may be implemented. One skilled in the art can appreciate that the computer system of FIG. 1 can in some embodiments effectuate the computer 200 and client 401 of FIG. 2 and FIG. 4. In these example embodiments, the computer 200 and client 401 can include some or all of the components described in FIG. 1 and circuitry configured to instantiate specific aspects of the present disclosure.

The term circuitry used through the disclosure can include hardware components such as hardware interrupt controllers, hard drives, network adaptors, graphics processors, hardware based video/audio codecs, and the firmware/software used to operate the hardware for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
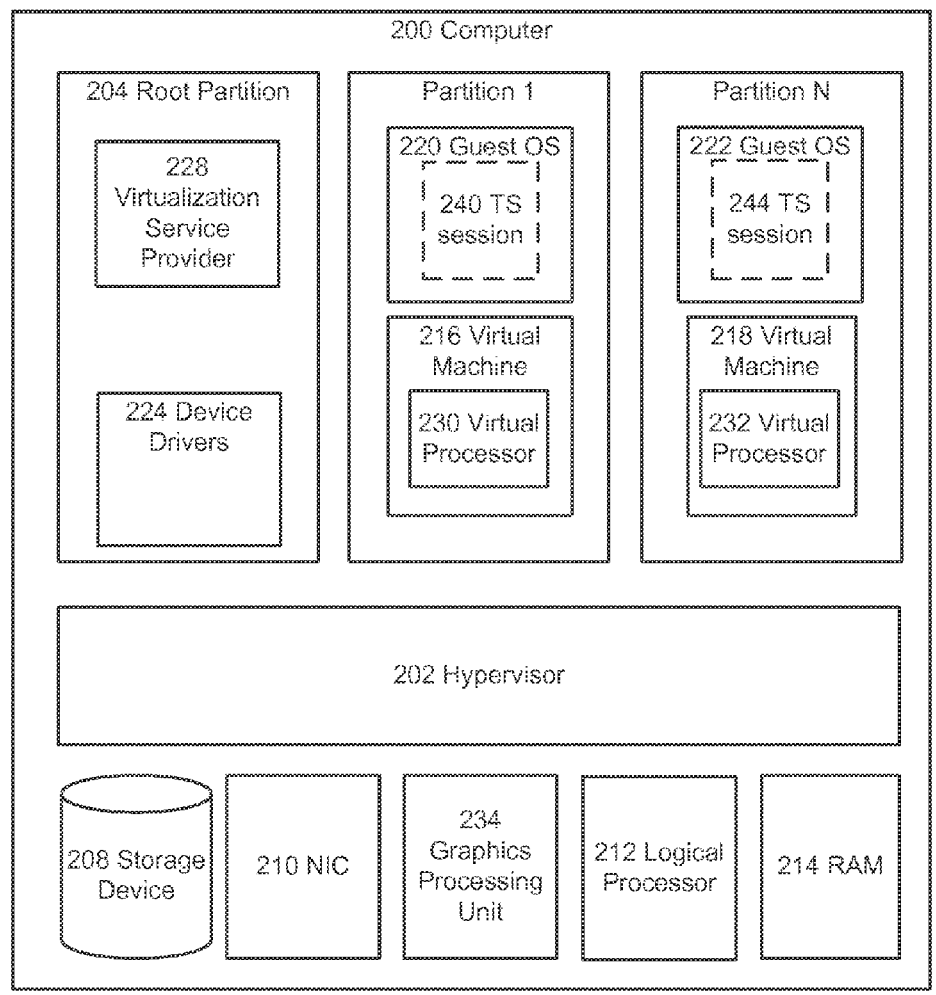
FIG. 2 depicts an operational environment for practicing aspects of the present disclosure.
Figure 3:
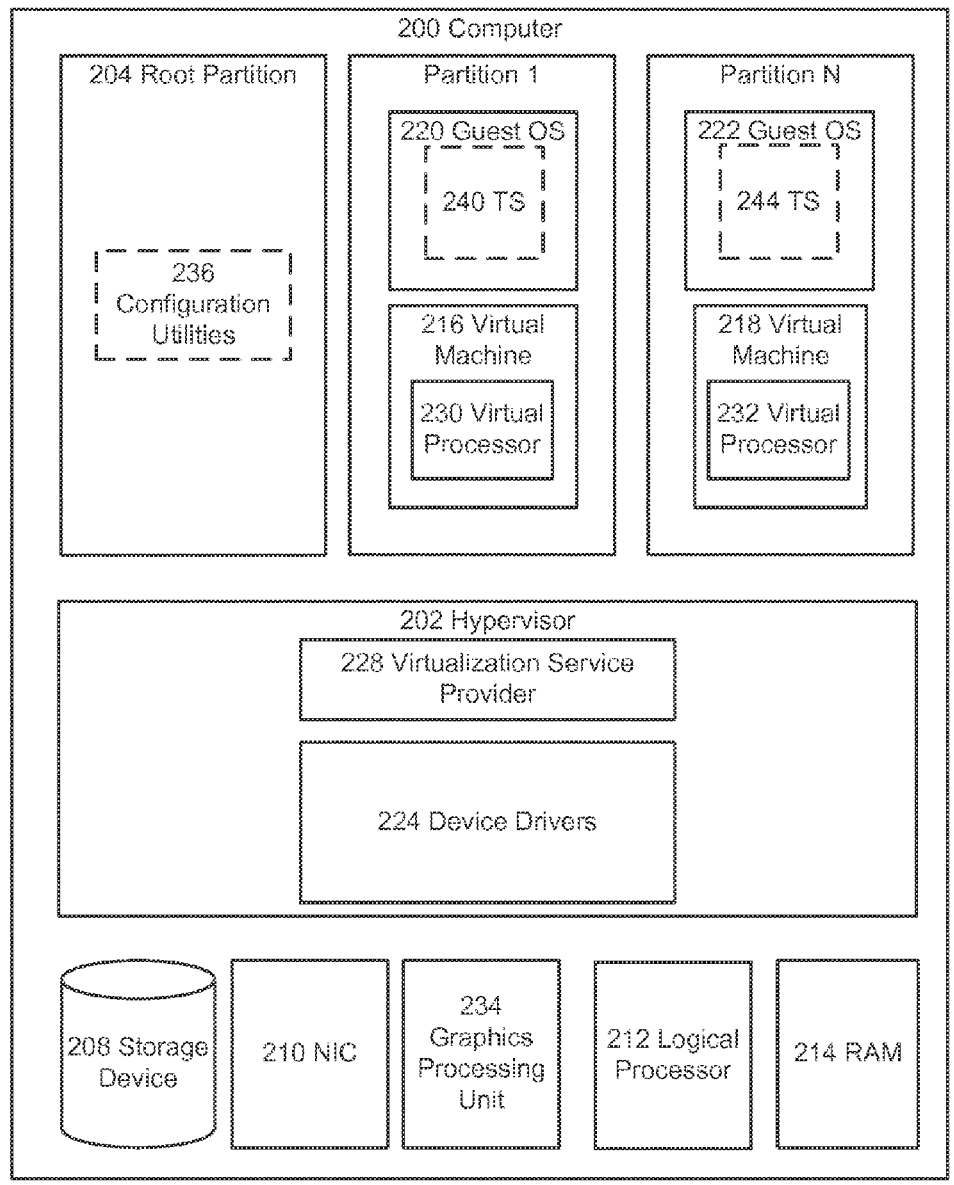
FIG. 3 depicts an operational environment for practicing aspects of the present disclosure.

Referring now to FIGS. 2 and 3, they depict high level overviews of computer systems including circuitry for virtualizing resources that can be used in aspects of the present disclosure. As shown by the figure, server 200 can include physical hardware devices such as storage device 208, e.g., a hard drive, a network interface controller (NIC) 210, a graphics card 234, at least one logical processor 212 and random access memory (RAM) 214. One skilled in the art can appreciate that while one logical processor is illustrated, in other embodiments computer 200 may have multiple logical processors, e.g., multiple execution cores and/or multiple processors. In these embodiments multiple threads can be executed at the same time, e.g., one or more threads per logical processor. Continuing with the description of FIG. 2, depicted is a hypervisor 202 that may also be referred to as a virtual machine monitor. The hypervisor 202 in the depicted embodiment includes executable instructions for controlling and arbitrating access to the hardware of server 200. The hypervisor 202 can generate execution environments called partitions such as partition 1 and partition N (where N is an integer greater than 1). In embodiments a partition can be considered the basic unit of isolation supported by the hypervisor 202, that is, each partition can be mapped to a set of hardware resources, e.g., memory, devices, logical processor cycles, etc., that is under control of the hypervisor 202. In an embodiment the hypervisor 202 can be a stand alone software produce, a part of an operating system, embedded within firmware of the motherboard or a portion of the hypervisor 202 can be effectuated by specialized integrated circuits.

Continuing with the description of FIG. 2, the computer 200 can include a root partition 204 that may include a virtualization service provider 228 (VSP). In this example architecture the root partition 204 can access the underlying hardware via device drivers 224. The VSP 228 in this example can effectuate interfaces in partitions know as children, and these children can be considered virtual machines. The virtualization service provider 228 effectuates virtual machines 216 and 218 by instantiating different classes of devices as software and exposes interfaces to the devices within the partitions. Each virtual machine can include a virtual processor such as virtual processors 230 and 232 that guest operating systems 220 and 222 can manage and schedule threads to execute thereon. As is illustrated, guest operating systems 220 and 222 can execute terminal servers (TS) 240 and 244. Generally, the virtual processors 230 and 232 are executable instructions and associated state information that provide a representation of a physical processor with a specific architecture. For example, one virtual machine may have a virtual processor having characteristics of an Intel x86 processor, whereas another virtual processor may have the characteristics of a Power PC processor. The virtual processors in this example can be mapped to logical cores of the computer system such that the instructions that effectuate the virtual processors will be backed by logical processors. Thus, in these example embodiments multiple virtual processors can be simultaneously executing while, for example, another logical processor is executing hypervisor instructions.

Referring now to FIG. 3, it illustrates an alternative architecture that can be used to practice embodiments of the present disclosure. FIG. 3 depicts similar components to those of FIG. 2, however in this example embodiment the hypervisor 202 can include the virtualization service provider 228 and device drivers 224, and the root 204 can contain configuration utilities 236. In this architecture the hypervisor 202 can perform the same or similar functions as the hypervisor 202 of FIG. 2. The hypervisor 202 of FIG. 3 can be a stand alone software produce, a part of an operating system, embedded within firmware of the motherboard or a portion of the hypervisor 202 can be effectuated by specialized integrated circuits. In this implementation the hypervisor 202 can be thought of as instructions that execute directly on the bare metal of the hardware. In this example the root partition 204 may have instructions that can be used to configure the hypervisor 204 however hardware access requests may be handled by the hypervisor 202 instead of being passed to the root partition 204.

Figure 4:
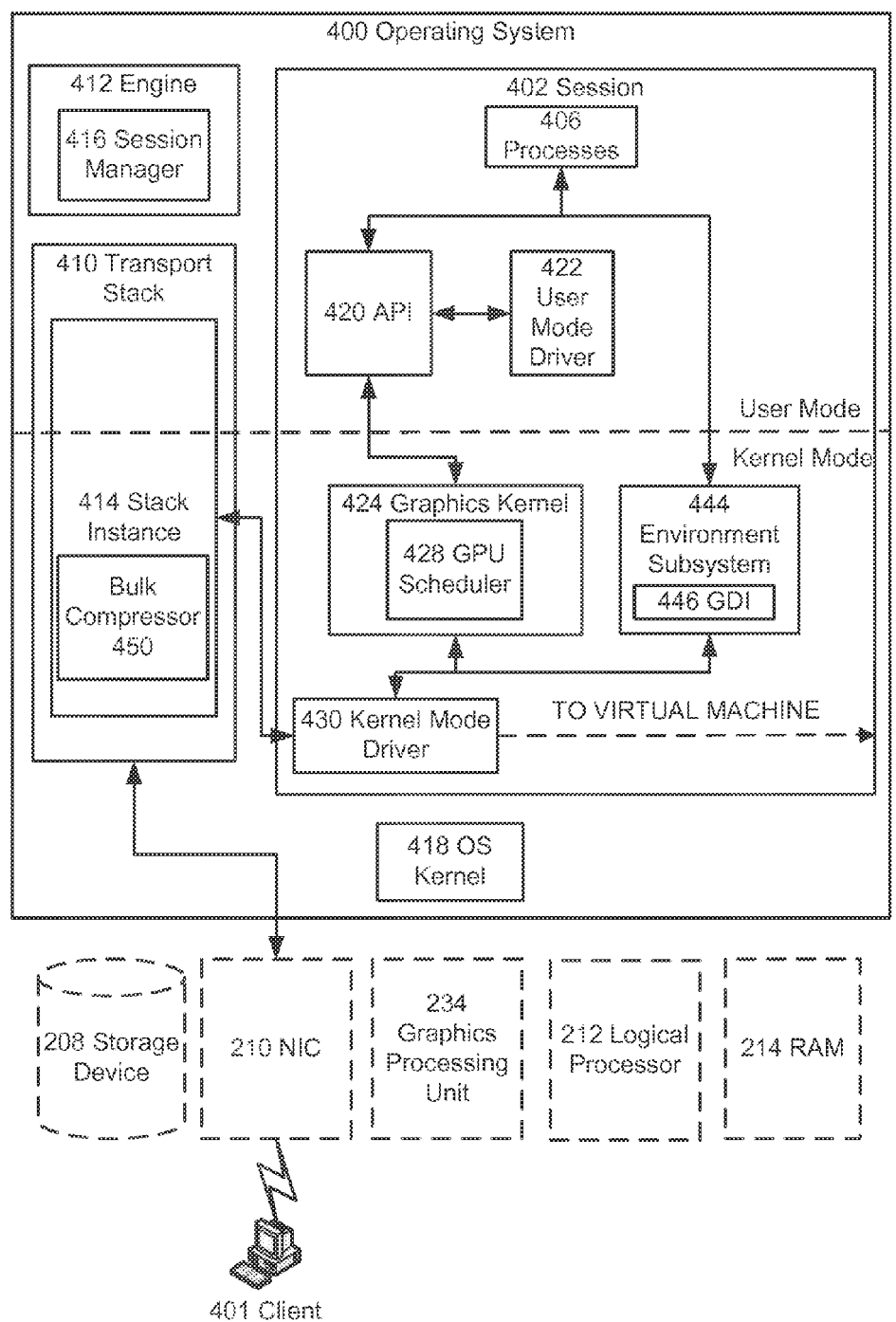
FIG. 4 depicts an operational environment for practicing aspects of the present disclosure.

Referring now to FIG. 4, it generally illustrates an example operating system 400 including an terminal service session 402 that can be used in embodiments of the present disclosure. One skilled in the art can appreciate that the example operating system 400 can be effectuated by a computer such as computer 20 of FIG. 1 or could be a host operating system executing within root partition 204. In another implementation operating system 400 could be a guest operating system 220 or 222 that is effectuated by a virtual machine such as VM 216 or VM 218. In reference to the figure, underlying hardware 208, 210, 234, 212, and 214 is indicated in dashed lines, which indicates that in an embodiment the hardware can be virtualized.

Terminal services can be provided to at least one client such as client 401 (while one client is depicted terminal services can be provided to more clients) in embodiments. The example client 401 can include a computer terminal that is effectuated by hardware configured to direct user input to the terminal server session and display user interface information generated by the session. In another embodiment, client 401 can be effectuated by a computer that includes similar elements as those of computer 20 FIG. 1. In this embodiment, client 401 can include circuitry configured to effect operating systems and circuitry configured to emulate the functionality of terminals, e.g., a remote desktop client application that can be executed by one or more logical processors 212. One skilled in the art can appreciate that the circuitry configured to effectuate the operating system can also include circuitry configured to emulate a terminal.

Operating system 400 can include instructions, that can configure a processor to generate sessions. Briefly, a session can generally include user mode processes 406 such as videogames, word processing programs, web browsers, user interfaces (windows, dialog boxes, desktop, etc.), media players and the like. The processes 406 can be effectuated by various subsystems, e.g., executing processes, that can provide a platform for execution of applications and interact with a kernel 418. One such subsystem is environment subsystem 244 and a graphics kernel 424 that will be explained in more detail below. A session can include a shell and a user interface (rendered by a user interface process), the subsystems that track mouse movement within the desktop, the subsystems that translate a mouse click on an icon into commands that effectuate an instance of a program, etc.

Generally, a session can be generated on a user by user basis when, for example, the operating system 400 receives a connection request over a network connection from a client such as client 401. Generally, a connection request can first be handled by the transport stack 410, e.g., a remote desktop protocol stack (RDP). The transport stack 410 code can configure the processor to listen for connection messages on a certain port and forward them to engine 412. When sessions are generated the transport logic 410 can be executed and can instantiate remote desktop protocol stack instances for each session such as stack instance 414. Generally, each remote desktop protocol stack instance can be configured to route output to an associated client and route client input to an environment subsystem 444 for the appropriate session.

During the session creation process a session manager 416 can be executed by a logical processor 212 and the processor 212 can initialize and manage each session by, for example, generating a session identifier for a session space; adding the session identifier to a table; assigning memory to the session space; and generating system environment variables and instances of subsystem processes in memory assigned to the session space.

As shown by the figure, in an embodiment processes 406 can execute within user mode of the session 402 and can use two distinct rendering techniques such as bitmaps generated by a graphics display interface (GDI) 246, 3D graphics, or a combination of both. The GDI 246 is useful for generating 2D images such as text and windows. The GDI 246 can be associated with a display driver that can generate bitmap images in response to receiving an array of bits from processes 406.

For example, an application may emit an array that can be processed by the display driver and used to render pixels representing color values.

Processes may additionally take advantage of 3D graphics and 2D graphics rendered by 3D hardware. Such graphics can be generated using a 3D graphics card made by one of a plurality of hardware vendors. Since different hardware vendors use different architectures and commands a graphics driver architecture can be made that abstracts the hardware so that developers can write a single application that works with any graphics card. In this example the application may access the features of the graphics processing unit of the client 401 by sending API constructs to an application programming interface 420 (API) such as Direct3D from Microsoft®. The API 420 in turn can generate primitives that can be sent to the client 401; translated by a driver of the client into commands that can be executed by the GPU of the client; and executed by the GPU of the client. Generally, the API 420 can include various commands for generating primitives, e.g., the fundamental geometric shapes used in computer graphics as building blocks for other shapes represented as vertices and constants.

Vertices can be generated and stored in a plurality of vertex buffers, e.g., pages of memory. When an application executes it can declare how it is going to use the buffer, e.g., what type of data it is going to store in the buffer. An application, such as a videogame, may use a dynamic vertex buffer to store primitives for an avatar and a static buffer for storing data that will not change often such as building data. As vertices are written to the vertex buffers, identification information for the primitives in the buffers can be sent to the graphics kernel 424 where identifiers for the primitives, for example, can be stored in an execution queue. In addition, the queue can include information about various bitmap images generated by the GDI 446. In this example the queue can be used to synchronize the rendering using 3D hardware and the displaying of bitmap images.

When rendering the primitives stored in various buffers, the graphics kernel 424 can send execute commands to the kernel mode driver 430. The kernel mode driver 430 can receive the commands and send, for example, signals to the stack instance 414 to send the specified commands to the client 401.

The following are a series of flowcharts depicting implementations of processes. For ease of understanding, the flowcharts are organized such that the initial flowcharts present implementations via an overall "big picture" viewpoint and subsequent flowcharts provide further additions and/or details.

Figure 5:
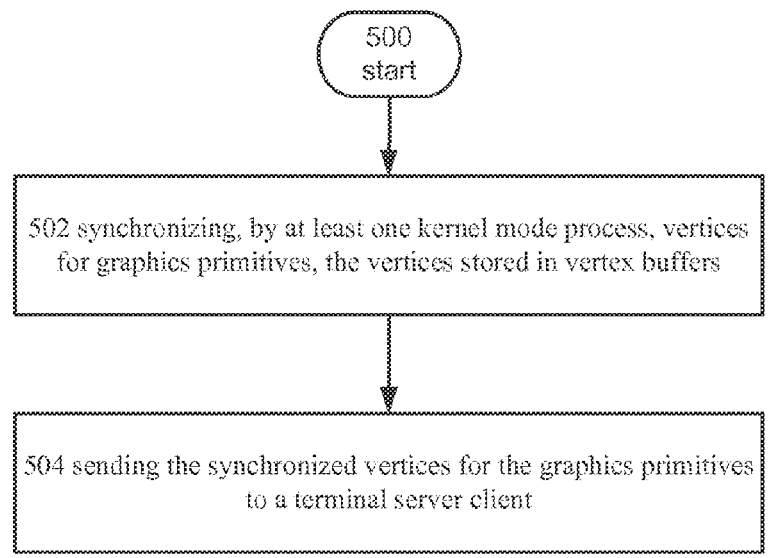
FIG. 5 depicts an operational procedure for practicing aspects of the present disclosure.

Referring now to FIG. 5, it depicts an operational procedure for practicing aspects of the present disclosure including the operations 500, 502, and 504. As shown by the figure, operation 500 begins the operational procedure and operation 502 shows synchronizing, by at least one kernel mode process, vertices for graphics primitives, the vertices stored in vertex buffers. For example, at least one kernel mode process can be executed by at least one logical processor 212 and the at least one logical processor 212 can synchronize the execution of vertices by a graphics processing unit in order to render primitives. For example, vertices for primitives can be stored in vertex buffers, e.g., pages or memory, and a kernel mode process, such as, for example, a operating system scheduler, an environment subsystem 444, a graphics kernel 424, or any other kernel mode subsystem or process, can synchronize the execution of the primitives. In a specific example, such as the example depicted by FIG. 4, a graphics processing scheduler 428, that can operate similarly to an operating system scheduler, can schedule GPU operations. More specifically, in this example the GPU scheduler 428 can merge separate streams of vertices into the correct execution order such that the graphics processing unit of the client 401 executes the commands in the correct order.

For example, one or more threads of a process such as a videogame may map vertex buffers and issue draw commands. Identification information for the vertices, e.g., information generated per buffer, per vertex, or per batch of vertices in a buffer, can be sent to the GPU scheduler 428. The information can be stored in a table along with identification information associated with vertices from the same, or other processes. The GPU scheduler 428 can schedule the execution of the vertices based on the identification information such that the commands are correctly ordered and then the GPU scheduler 428 can send execute commands to the kernel mode driver 430.

In another specific example, a word processing program could execute and declare two buffers, for example, one for storing vertices for generating 3D menus and the other one storing commands for generating letters that will populate the menus. The application can map the buffers, issue draw commands and the GPU scheduler 428 can determine the order for executing the two buffers such that the menus are rendered along with the letters in a way that it would be pleasing to a user. For example, other processes may issue draw commands at the same or a substantially similar time and if the vertices were not synchronized, vertices from different threads of different processes could be rendered asynchronously on the client 401 thereby making the final image seem chaotic or jumbled.

Continuing with the description of FIG. 5, operation 504 shows sending the synchronized vertices for the graphics primitives to a terminal server client. Continuing with the description of FIG. 5, the kernel mode driver 430 in this example can send a signal to the stack instance 414 associated with the session 402 directing the stack instance 414 to send the vertices in a specific order and the stack instance 414 can send the commands in the vertex buffers to client 401 via network interface card 210.

Figure 6:
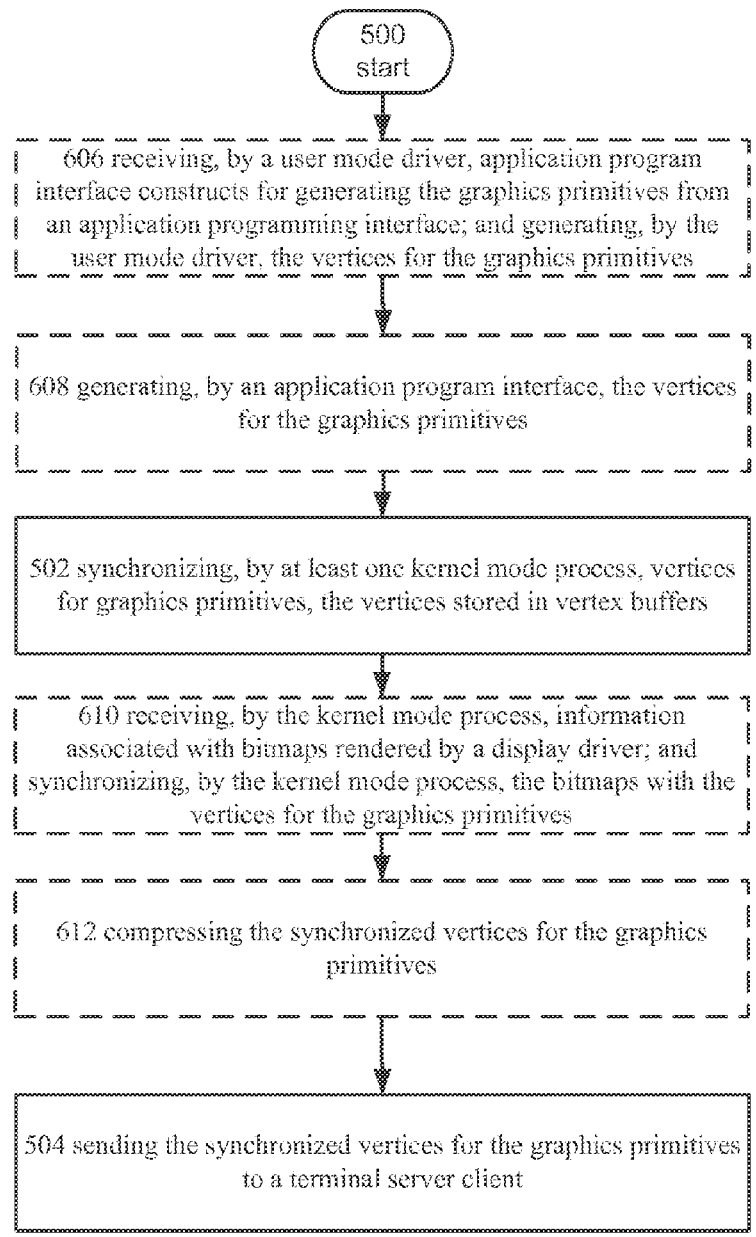
FIG. 6 illustrates an alternative embodiment of the operational procedure 500 of FIG. 5.

Referring now to FIG. 6, it illustrates an alternative embodiment of the operational procedure of FIG. 5 including the additional operations 606-612 indicated in dashed lines, which is indicative of the fact that they are considered optional. Operation 606 illustrates receiving, by a user mode driver, application program interface constructs for generating the graphics primitives from an application programming interface; and generating, by the user mode driver, the vertices for the graphics primitives. For example, and referring to FIG. 4, an application program interface 420 can receive API constructs from a process and can generate commands for generating graphics primitives. For example, the API 420 can include interfaces that can be exposed to processes such as a user interface of the operating system 400. The process can send constructs for primitives such as Point Lists, Line Lists, Line Strips, Triangle Lists, Triangle Strips, or Triangle Fans, to the API 420. Or put another way, the process can send high level API commands to the API 420. The API 420 can receive these commands; generate vertices; and pass them to a user mode driver 422. In an embodiment a user mode driver 422 can translate them and store them in one or more vertex buffers. As one skilled in the art can appreciate, the vertices generated by the API 420 and translated by the user mode driver 422 are substantially larger in terms of bytes than the API constructs because the API is located at a lower logical level in the computer system. That is, the number of bytes representing a construct for generating a triangle at the API level may end up being a number of primitives that takes up 5 to 10 times as many bytes to store.

Continuing with the description of FIG. 6, operation 608 depicts generating, by an application program interface, the vertices for the graphics primitives. For example, the application program interface 420 can receive constructs from various executing processes and can generate vertices that can be stored in one or more vertex buffers, e.g., one or more pages of memory in RAM 214 and/or memory of the graphics processor 234. In an embodiment the vertex data can be generated by, for example, the API 420 in response to receiving API constructs from an application such as, for example, a videogame, media player, CAD program, user interface, etc. That is, an application could pass the API 420 one or more constructs and the API 420 could generate thousands of primitives and store them in one or more vertex buffers.

Continuing with the description of FIG. 6, operation 610 shows receiving, by the kernel mode process, information associated with bitmaps rendered by a display driver; and synchronizing, by the kernel mode process, the bitmaps with the vertices for the graphics primitives. For example, and referring to FIG. 4, a process may emit instructions to render bitmaps to a graphics device interface subsystem 446. The graphics device interface subsystem 446 can render the bitmaps and these bitmaps can be synchronized with vertices for the primitives. For example, there are situations where processes such as user interfaces, and/or applications may emit bitmaps and use 3D API's to generate 3D graphics. That is, certain applications may use the API 420, generate bitmaps, or both depending on how the applications were developed. Others, for example, may have a proprietary command stream, such that they may only emit a bitmap. The terminal server in this instance would not have an opportunity to intercept API constructs or vertices. In these cases the operating system 400 merely receives instructions to render the final image.

In these example instances, the kernel mode process can synchronize vertices and bitmaps such that bitmaps and 3D graphics can be merged into a final stream of execution that is rendered correctly. For example, the kernel mode process in this example can receive information that associates the vertices with the bitmap and the kernel mode process can determine to send the vertices and the bitmap in the same stream to the client 401. In this example the client 401 can receive the merged stream, execute the commands, and render the bitmap along with the image generated by the primitives.

Continuing with the description of FIG. 6, operation 612 shows compressing the synchronized vertices for the graphics primitives. For example, a bulk compressor 450 can be used to compress the commands for the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices (instead of receiving multiple API constructs of different type from multiple applications) the bulk compressor 450 has a larger data set of vertices to sift through in order to compress. That is, since the vertices for a plurality of processes are being remoted, instead of diverse API calls, there is a larger chance that the bulk compressor 450 will be able to find similar patterns in a run.

In the same, or other embodiments the commands and/or bitmaps can be compressed using lossy compressors, move to front encoders, mesh compressors, and the like. These techniques are described in U.S. patent application Ser. No. 12/330330 entitled "Improved Command Remoting Techniques" filed on Dec. 8, 2008, the contents of which is fully incorporated by reference.

Figure 7:
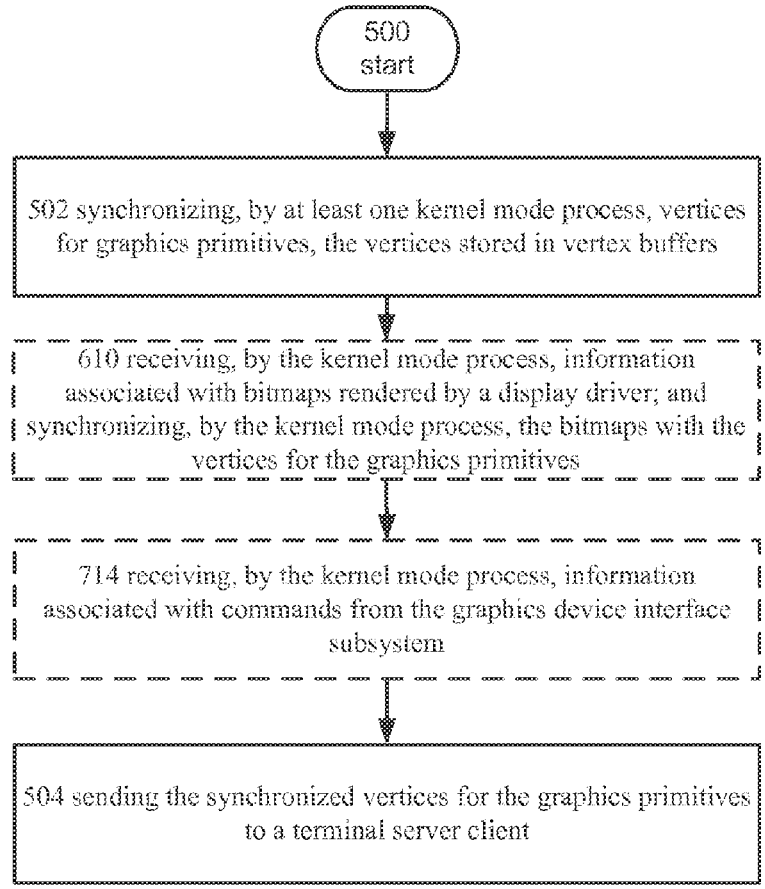
FIG. 7 illustrates an alternative embodiment of the operational procedure 500 of FIG. 6.

Referring now to FIG. 7, it illustrates an alternative embodiment of the operational procedure of FIG. 6 including the additional operation 714 that shows receiving, by the kernel mode process, information associated with commands from the graphics device interface subsystem. For example, the graphics device interface subsystem 446 can generate commands in addition to rendering bitmaps for processes 406. For example, and stated above, the operating system 400 may not have access to a stream of commands for generating primitives from a processes and instead the environment subsystem 444 may merely receive requests to render the bitmaps. In this example, instead of merely rendering bitmaps, the GDI 446 can additionally generate certain commands. By providing the GDI 446 with the ability to generate commands, the amount of data that has to be compressed and sent to the client 401 can be reduced. For example, some example commands that the GDI 446 can generate can include, but are not limited to, a screen to screen blit, e.g., a copy from one part of the screen to another, a pattern blit, e.g., a solid fill, etc. In a specific example, instead of repainting the entire screen when a user moves a window from one portion of the screen to another, the GDI 446 can generate a screen-to-screen blit command. The kernel mode process can receive information that identifies the screen-to-screen blit and can synchronize the command with other commands and/or bitmaps and send the screen-to-screen blit command to the client 401 via the stack instance 414.

Figure 8:
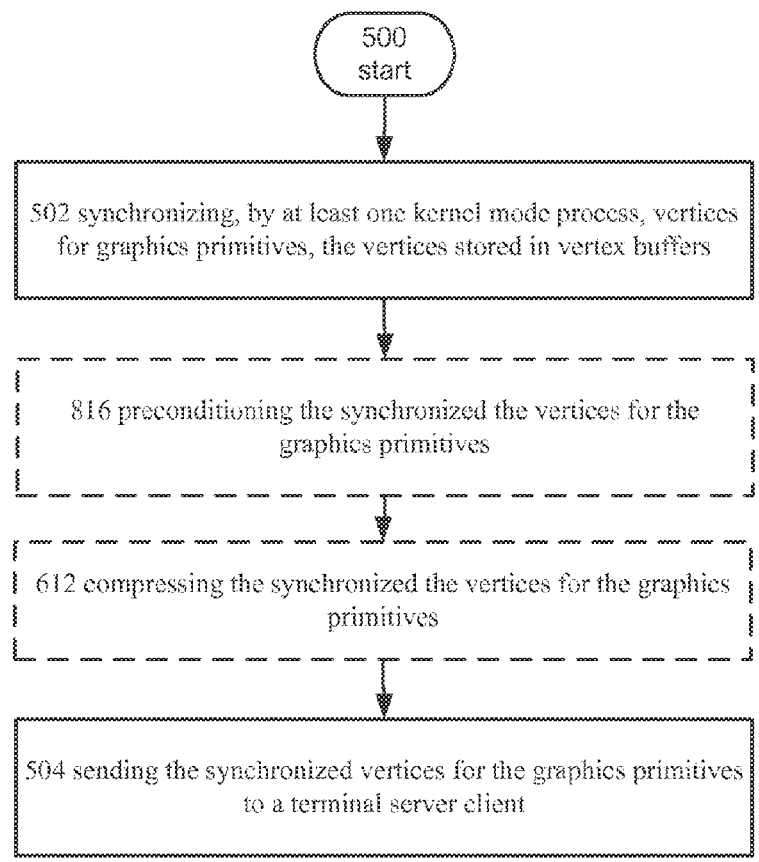
FIG. 8 illustrates an alternative embodiment of the operational procedure 500 of FIG. 6.

Referring now to FIG. 8, it illustrates an alternative embodiment of the operational procedure of FIG. 6 including the additional operation 816 that shows preconditioning the synchronized the vertices for the graphics primitives. For example, in an embodiment of the present disclosure a preconditioner can be included. The preconditioner can be configured to parse the stream of commands for generating the graphics primitives and place them in a format that will allow the bulk compressor 450 to more easily find patterns and compress the data. Generally speaking, a move to front coder, delta preconditioning, at the like can be used. These techniques are described in U.S. patent application Ser. No. 12/330330 entitled "Improved Command Remoting Techniques" filed on Dec. 8, 2008.

Figure 9:
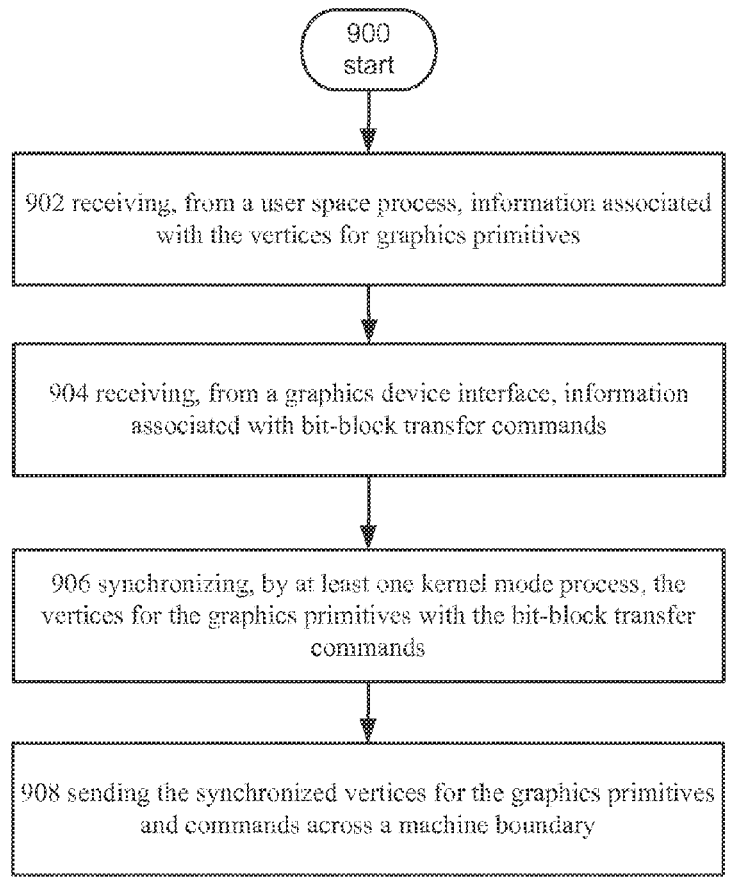
FIG. 9 illustrates an example operational procedure for practicing aspects of the present disclosure.

Turning now to FIG. 9, it depicts an operational procedure for practicing aspects of the present disclosure including the operations 900, 902, 904, 906, and 908. As shown by the figure, operation 900 begins the operational procedure and operation 902 shows receiving, from a user space process, information associated with the vertices for graphics primitives. Referring to FIG. 4, in an embodiment of the present disclosure information associated with vertices for primitives can be received from a user space process, e.g., an API 420, a user mode driver 422, etc. Similar to that described above, the vertices can be used by a graphics processing unit of the client 401 to render one or more triangles or lines. For example, in certain terminal service embodiments the user mode driver API 422 can facilitate the translation from higher-level API constructs to vertices. These vertices can then be stored in one or more vertex buffers of, for example, the user mode driver 422, the transport stack 410, the stack instance 414, the graphics kernel 424, or one or more pages of memory assigned to the session 402. One or more packets of information identifying the commands stored in the vertex buffers can be sent to a kernel mode process, such as for example, the GPU scheduler 428, or the OS kernel 418, etc.

Continuing with the description of FIG. 9, operation 904 depicts receiving, from a graphics device interface, information associated with bit-block transfer commands. As shown by the operation, commands associated with performing a bit-block transfer can be received from, for example, a graphics display subsystem 446. In this example, a bit-block transfer command can include an operation in which several bitmaps are combined into one using a raster operation. For example, the commands can be used to combine two bitmaps, such as a source and a destination. The source and destination bitmaps can be combined according to a specified Raster OPeration (ROP) and the result is then written on to the destination bitmap. A basic ROP merely overwrites the destination rectangle with the source rectangle or uses an operation such as AND, OR, XOR and NOT. In specific examples the bit-block transfer commands can include, but are not limited to, a screen to screen blit, e.g., a copy from one part of the screen to another, a pattern blit, e.g., a solid fill, etc.

Continuing with the description of FIG. 9, operation 906 shows synchronizing, by at least one kernel mode process, the vertices for the graphics primitives with the bit-block transfer commands. For example, and referring to FIG. 4, operation 906 illustrates that at least one kernel mode process, e.g., the graphics kernel 424, environment subsystem 444, operating system kernel 418, or a combination can synchronize the vertices stored in one or more vertex buffers with the bit-block transfer commands. In this example, the at least one kernel mode process can merge the vertices and bitmap(s) into a stream of execution.

As shown by operation 908 of FIG. 9, in an embodiment the operational procedure can include sending the synchronized vertices for the graphics primitives and commands across a machine boundary. For example, one the commands and vertices have been synchronized and merged into a stream it can be sent across a machine boundary, e.g., sent from the terminal server session 402 to another operating system. In an embodiment the stream of commands and vertices can be comprised of vertices stored in various vertex buffers. In this example the kernel mode driver 430 can execute the vertices/bit-block transfer commands in a specific order.

Figure 10:
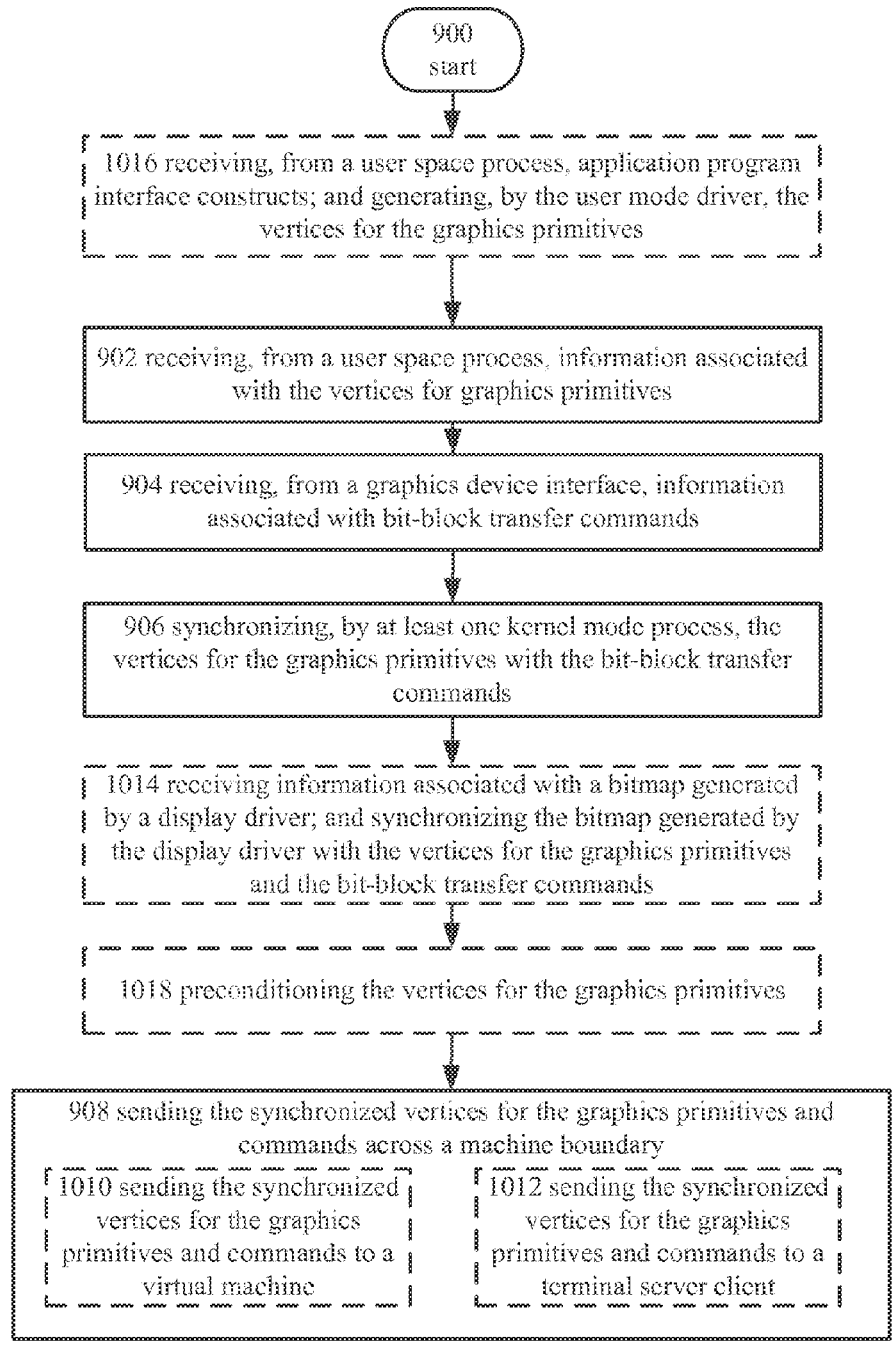
FIG. 10 illustrates an alternative embodiment of the operational procedure 900 of FIG. 9.

Referring now to FIG. 10, it depicts an alternative embodiment of the operational procedure 900 of FIG. 9 including operations 1010-1018. Operation 1010 shows sending the synchronized vertices for the graphics primitives and commands to a virtual machine. For example, and referring to FIG. 2, 3, and FIG. 4, in an embodiment of the present disclosure the synchronized vertices and commands can be sent across a machine boundary to a virtual machine, e.g., sent from virtual machine 216 to virtual machine 218 of FIG. 2 for example. In this embodiment, a partition bus can be used to transfer the commands across the machine boundary using techniques described in commonly assigned application Ser. No. 11/128,647 entitled "Partition Bus," the contents of which are hereby incorporated by reference in its entirety. For example, in this embodiment the stream of commands can be sent to a virtual machine that includes virtual desktop techniques.

Continuing with the description of FIG. 10, operation 1012 shows sending the synchronized vertices for the graphics primitives and commands to a terminal server client. Continuing with the description of FIG. 6, the kernel mode driver 430 in this example can send a signal to the stack instance 414 associated with the session 402 directing the stack instance 414 to send the contents of the vertex buffers and the commands in a specific order. The stack instance 414 can then send the commands in the vertex buffers to client 401 via network interface card 210.

Referring now to operation 1014 of FIG. 10, it depicts receiving information associated with a bitmap generated by a display driver; and synchronizing the bitmap generated by the display driver with the vertices for the graphics primitives and the bit-block transfer commands. For example, and referring to FIG. 4, in an embodiment of the present disclosure a process may emit instructions to render bitmaps to a graphics device interface subsystem 446. A display driver of the graphics device interface subsystem 446 can render the bitmaps and these bitmaps can be interleaved with the vertices. In this example embodiment, the at least one kernel mode process can synchronize vertices, bitmaps, and bit-block transfer commands into an ordered command stream. The client 401 can receive the merged stream, execute the stream and display the final image.

Continuing with the description of FIG. 10, operation 1016 shows receiving, from a user space process, application program interface constructs; and generating, by the user mode driver, the vertices for the graphics primitives. For example, a user mode process such as a user interface can make API calls. In this example, a user mode driver 422 can generate vertices for primitives. For example, API 420 can include one or a set of application program interfaces that can allow for a software developer to develop applications that can access the hardware of a computer system without knowing the exact hardware.

Referring to operation 1018, it shows preconditioning the vertices for the graphics primitives. For example, in an embodiment of the present disclosure a preconditioner can be included. The preconditioner can be configured to parse the stream of commands for generating the graphics primitives and place them in a format that will allow the bulk compressor 450 to more easily find patterns and compress the data. Generally speaking, a move to front coder, delta preconditioning, at the like can be used.

Figure 11:
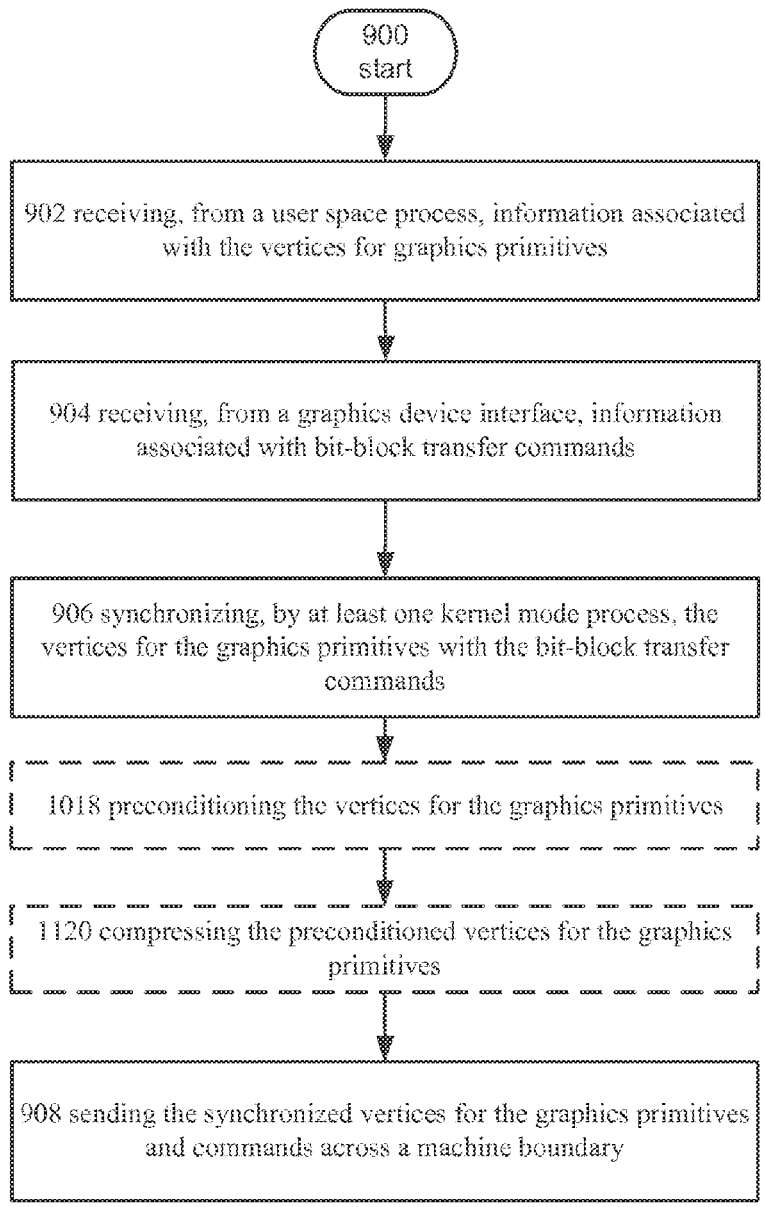
FIG. 11 illustrates an alternative embodiment of the operational procedure 900 of FIG. 10.

Referring now to FIG. 11, it illustrates an alternative embodiment of the operational procedure of FIG. 10 including the operation 1120 that shows compressing the preconditioned vertices for the graphics primitives. For example, a bulk compressor 450 can be used to compress the commands for the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401.

In the same, or other embodiments the commands and/or bitmaps can be compressed using lossy compressors, move to front encoders, mesh compressors, and the like. These techniques are described in U.S. patent application Ser. No. 12/330330 entitled "Improved Command Remoting Techniques" filed on Dec. 8, 2008, the contents of which is fully incorporated by reference.

Figure 12:
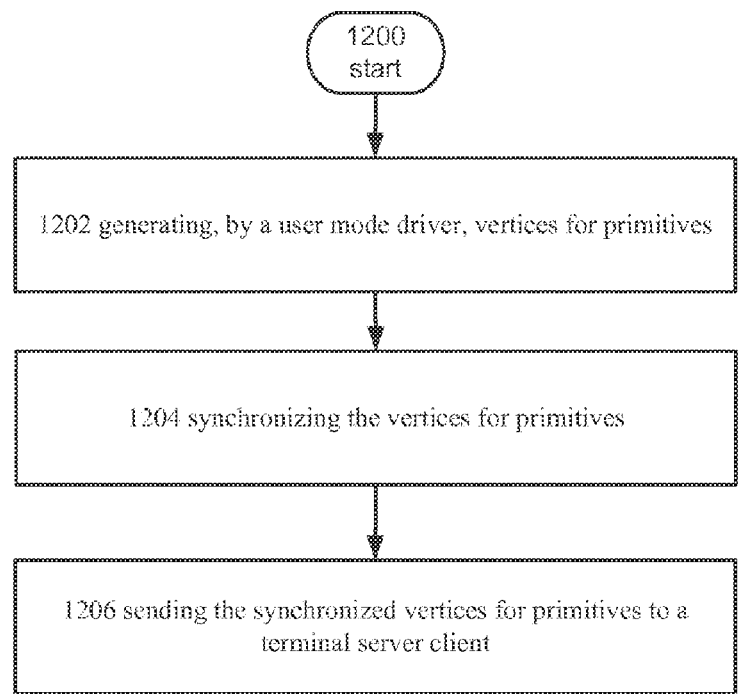
FIG. 12 illustrates an example operational procedure for practicing aspects of the present disclosure.

Referring now to FIG. 12, it illustrates an operational procedure for practicing aspects of the present disclosure including operations 1200-1206. As shown by the figure, operation 1200 begins the operational procedure and operation 1202 shows generating, by a user mode driver, vertices for primitives. Referring to FIG. 4, in an embodiment of the present disclosure a user mode driver 422 can generate vertices that can be processed by a GPU and information associated with vertices can be received from the user mode driver 422. Similar to that described above, vertices for primitives can be stored in vertex buffers, e.g., pages or memory, and a kernel mode process, such as, for example, a operating system scheduler, an environment subsystem 444, a graphics kernel 424, or any other kernel mode subsystem or process.

Continuing with the description of FIG. 12, operation 1204 depicts synchronizing the vertices for primitives. For example, and referring to FIG. 4, at least one kernel mode process, e.g., the graphics kernel 424, environment subsystem 444, operating system kernel 418, or a combination can synchronize the device level commands. For example, the commands can be put in a queue for execution. The vertices can then be synchronized, e.g., an order of execution for the vertices can be determined. In a specific example, such as the example depicted by FIG. 4, a graphics processing scheduler 428, that can operate similarly to an operating system scheduler, can schedule GPU operations.

Referring now to operation 1206, it illustrates sending the synchronized vertices for primitives to a terminal server client. Continuing with the description of FIG. 12, the kernel mode driver 430, instead of sending the commands to the GPU of the computer 200, the kernel mode driver 430 can send execution commands to the stack instance 414. The stack instance 414 can then send the primitives to a terminal server client for execution on the client's GPU.

Figure 13:
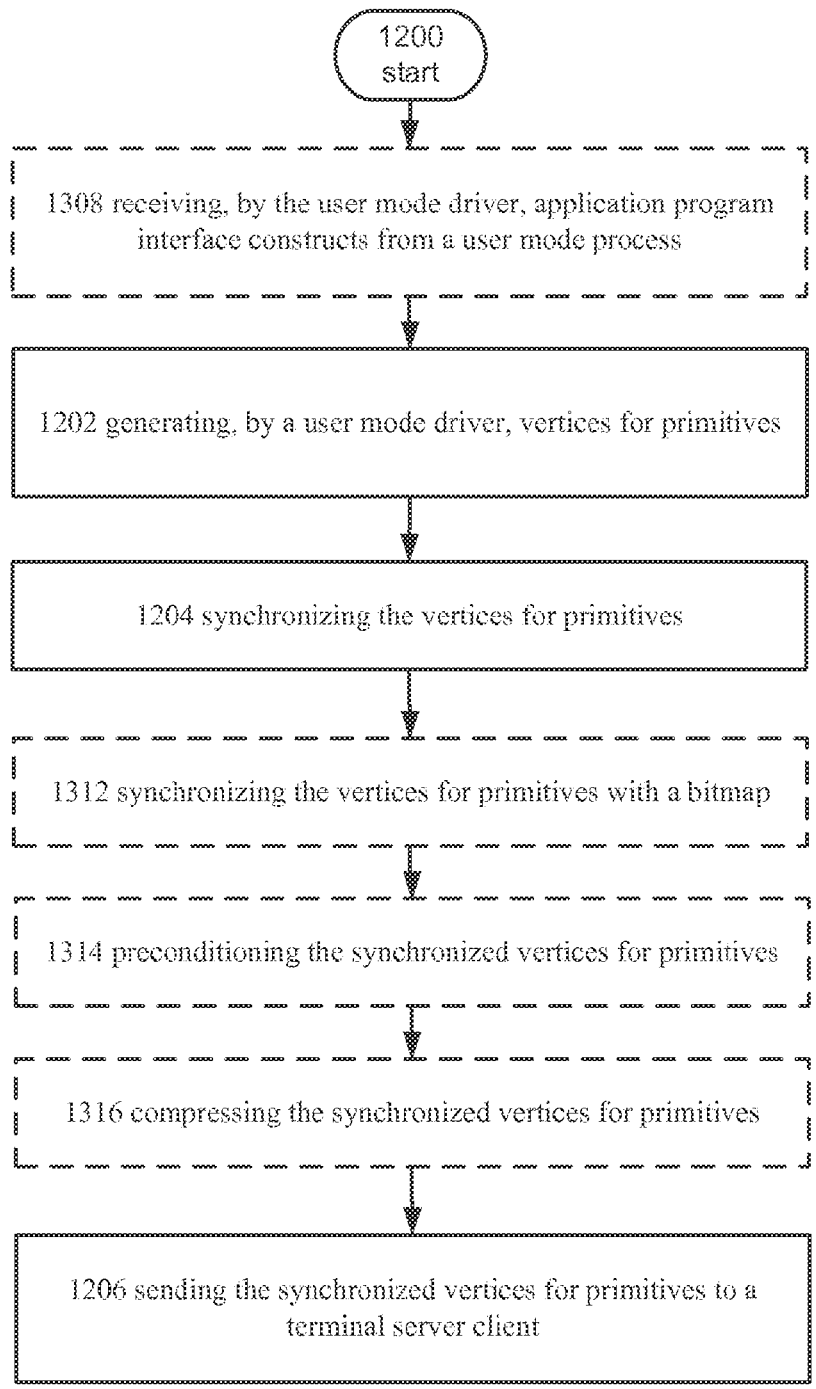
FIG. 13 illustrates an alternative embodiment of the operational procedure 900 of FIG. 12.

Referring to FIG. 13, it shows an alternative embodiment of the operational procedure 1200 including operations 1308, 1310, 1312, and 1314. Operation 1308 shows receiving, by the user mode driver, application program interface constructs from a user mode process. For example, and referring to FIG. 4, a user mode driver 422 can receive API calls from, for example an executing process such as a videogame. The process can send commands for primitives such as Point Lists, Line Lists, Line Strips, Triangle Lists, Triangle Strips, or Triangle Fans, to the API 420. Or put another way, the process can send high level API constructs to the API 420 which in turn can generate one or more vertices.

Continuing with the description of FIG. 13, operation 1310 shows synchronizing the vertices for primitives with a bitmap. For example, and referring to FIG. 4, a bitmaps can be rendered by a display driver of the graphics device interface subsystem 446 and in this example embodiment the bitmap can be interleaved with the commands for generating the graphics primitives. In this example embodiment, the at least one kernel mode process can merge the 3-D graphics commands and the bitmaps into an ordered command stream. For example, the at least kernel mode process in this example can receive information that associates the commands for generating the primitives with the bitmap and the kernel mode process can determine to send the commands and the bitmap in the same stream to the client 401 so that the client 401 can receive the merged stream, execute the commands, and render the bitmap along with the image generated by the primitives.

Continuing with the description of FIG. 13, operation 1312 illustrates synchronizing the vertices for primitives with bit-block transfer commands. As shown by the operation, commands associated with performing a bit-block transfer can be received from, for example, a graphics display subsystem 446. In this example, a bit-block transfer command can include an operation in which several bitmaps are combined into one using a raster operation. For example, the commands can be used to combine two bitmaps, such as a source and a destination. In specific examples the bit-block transfer commands can include, but are not limited to, a screen to screen blit, e.g., a copy from one part of the screen to another, a pattern blit, e.g., a solid fill, etc.

Referring again to FIG. 13, operation 1314 shows preconditioning the synchronized vertices for primitives. For example, in an embodiment of the present disclosure a preconditioner can be included. The preconditioner can be configured to parse the stream of commands for generating the graphics primitives and place them in a format that will allow the bulk compressor 450 to more easily find patterns and compress the data. Generally speaking, a move to front coder, delta preconditioning, at the like can be used.

Continuing with the description of FIG. 13, operation 1316 shows compressing the synchronized vertices for primitives. For example, the stream of vertices can be compressed using the bulk compressor 450. In an embodiment the bulk compressor 450 can be a component of the stack instance 414 and the bulk compressor can be configured to look for similar patterns within the stream of data that is being sent to the client 401.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for processing graphics on a terminal server for a terminal server client in communication with the terminal server over a network, comprising:
storing vertices in a plurality of vertex buffers, the vertices being associated with graphics primitives;
synchronizing an order for executing the vertices from the plurality of vertex buffers at the terminal server client for rendering the graphics primitives, the synchronization being based on identifications of the graphics primitives, the synchronization being performed by at least one kernel mode process at the terminal server;
synchronizing the order for executing the vertices with an order for rendering a bitmap at the terminal server client, the synchronization being performed by at least one kernel mode process at the terminal server; and
sending the vertices, the bitmap, and the synchronized order for executing the vertices and the order for rendering the bitmap to the terminal server client.

2. The method of claim 1, further comprising:
receiving, by a user mode driver, application program interface constructs for generating the graphics primitives from an application programming interface; and
generating, by the user mode driver, the vertices for the graphics primitives.

3. The method of claim 1, further comprising:
generating, by an application program interface, the vertices for the graphics primitives.

4. The method of claim 1, further comprising:
receiving, by the kernel mode process, information associated with the bitmap, the bitmap being rendered by a display driver;
synchronizing, by the kernel mode process, the bitmap with the vertices based on the received information.

5. The method of claim 1, further comprising:
compressing the synchronized vertices for the graphics primitives.

6. The method of claim 4, further comprising:
receiving, by the kernel mode process, information associated with commands from the display driver.

7. The method of claim 5, further comprising:
preconditioning the synchronized vertices for the graphics primitives.

8. A computer system comprising:
a processor and a memory having stored thereon instructions that, when executed by the processor, cause the system to at least:
store a vertex associated with a graphics primitive in a buffer, the vertex being received from a first source;
receive information associated with a bit-block transfer command, the bit-block transfer command being associated with combining a plurality of bitmaps received from a second source, the plurality of bitmaps being configured for rendering based on the bit-block transfer command;
synchronize an order for executing the vertex and the bit-block transfer command based on an identification of the graphics primitive and the received information; and
transmit the vertex, the plurality of bitmaps, and the order for executing the vertex and the bit-block transfer command across a machine boundary.

9. The computer system of claim 8, wherein the vertex, the plurality of bitmaps, and the order for executing the vertex and the bit-block transfer command are transmitted to a virtual machine.

10. The computer system of claim 8, the vertex, the plurality of bitmaps, and the order for executing the vertex and the bit-block transfer command are transmitted to a terminal server client.

11. The computer system of claim 8, wherein the memory has stored thereon further instructions that, upon execution, cause the system to at least:
receive information associated with a bitmap generated by a display driver; and
synchronize the bitmap generated by the display driver with the vertex and the bit-block transfer command.

12. The computer system of claim 8, wherein the memory has stored thereon further instructions that, upon execution, cause the system to at least:
receive application program interface constructs; and
generate the vertex for the graphics primitive.

13. The computer system of claim 8, wherein the memory has stored thereon further instructions that, upon execution, cause the system to at least
precondition the vertex for the graphics primitive.

14. The computer system of claim 13, wherein the memory has stored thereon further instructions that, upon execution, cause the system to at least
compress the preconditioned vertex for the graphics primitive.

15. A computer readable storage device including processor executable instructions, that when executed by a processor cause:
generating and storing, by a user mode driver, vertices for primitives in a plurality of buffers;
synchronizing an order for executing the stored vertices from the plurality of buffers at a terminal server client, the synchronization being based on identifications of the graphics primitives, the synchronization being performed by at least one kernel mode process at a terminal server;
synchronizing the order for executing the stored vertices with an order for rendering a bitmap at the terminal server client, the synchronization being performed by at least one kernel mode process at the terminal server; and
sending the stored vertices, the bitmap, and the synchronized orders for executing the stored vertices and for rendering the bitmap to the terminal server client.

16. The computer readable storage device of claim 15, further comprising:
receiving, by the user mode driver, application program interface constructs from a user mode process.

17. The computer readable storage device of claim 15, further comprising:
synchronizing the vertices for primitives with a bitmap.

18. The computer readable storage device of claim 15, further comprising:
synchronizing the vertices for primitives with bit-block transfer commands.

19. The computer readable storage device of claim 15, further comprising:
preconditioning the synchronized vertices for primitives.

20. The computer readable storage device of claim 15, further comprising:
compressing the synchronized vertices for primitives.

* * * * *